(12) United States Patent
Barnhart et al.

(10) Patent No.: US 7,701,891 B2
(45) Date of Patent: Apr. 20, 2010

(54) DATA HANDLING IN A DISTRIBUTED COMMUNICATION NETWORK

(75) Inventors: Randy C. Barnhart, Parker, CO (US); Donald V. Schnaidt, Centennial, CO (US); Steven W. Talcott, Larkspur, CO (US); Craig S. Kloosterman, Denver, CO (US); Melinda C. Milani, Parker, CO (US)

(73) Assignee: Raytheon Company, Waltham, MA (US)

( * ) Notice: Subject to any disclaimer, the term of this patent is extended or adjusted under 35 U.S.C. 154(b) by 857 days.

(21) Appl. No.: 11/083,379

(22) Filed: Mar. 18, 2005

(65) Prior Publication Data

US 2006/0209736 A1 Sep. 21, 2006

(51) Int. Cl.
*H04B 7/185* (2006.01)
(52) U.S. Cl. .................................. 370/316; 370/516
(58) Field of Classification Search ................ 455/524, 455/11; 370/516, 517, 229, 232, 235, 316; 703/8; 709/253; 725/91; 701/213
See application file for complete search history.

(56) References Cited

U.S. PATENT DOCUMENTS

| | | | |
|---|---|---|---|
| 6,081,570 A | | 6/2000 | Ghuman et al. |
| 6,301,231 B1* | 10/2001 | Hassan et al. ................ 370/316 |
| 6,597,892 B1 | 7/2003 | Caldwell, III et al. |
| 6,658,027 B1* | 12/2003 | Kramer et al. ............... 370/516 |
| 6,813,596 B2* | 11/2004 | Ellis et al. ........................ 703/8 |
| 2004/0043725 A1* | 3/2004 | Satoh .......................... 455/11.1 |
| 2004/0229642 A1* | 11/2004 | Derks et al. .................. 455/524 |
| 2005/0010695 A1* | 1/2005 | Coward et al. .............. 709/253 |
| 2005/0039212 A1* | 2/2005 | Baran et al. ................... 725/91 |
| 2005/0234643 A1* | 10/2005 | Abraham et al. ............ 701/213 |

OTHER PUBLICATIONS

Communication from the European Patent Office, European Search Report for Application No. PCT/US2006/009388, 5 pages, Jul. 28, 2006 and Written Opinion of the International Search Authority 6 pages.

Choi, K.K. et al., "The Implementation and Validation of the New Standard CCSDS File Delivery Protocol for Multi-Hopped Space File Transfer," Aerospace Conference 1999, Proceedings 1999 Snowmass at Aspen, Co., pp. 153-163, Mar. 6, 1999.

(Continued)

*Primary Examiner*—Kwang B Yao
*Assistant Examiner*—Syed Bokhari
(74) *Attorney, Agent, or Firm*—Baker Botts L.L.P.

(57) ABSTRACT

In one embodiment, a system for data handling in a distributed communication network includes one or more data-handling nodes (DHNs) each residing at one of one or more centrals that are each operable to receive a stream of first data units from a routing system. The stream of first data units includes both stored mission data (SMD) and telemetry data having originated at one or more remote units. Each DHN is operable, in near real time, to remove redundant instances of first data units from the stream of first data units, properly order first data units in the stream of first data units received at the central out of order, remove misconfigured first data units from the stream of first data units, extract the SMD from the stream of first data units, generate second data units from the extracted SMD, and communicate a stream of the second data units to one or more interface data processors (IDPs).

34 Claims, 4 Drawing Sheets

OTHER PUBLICATIONS

Back et al., "Expected File Delivery Time of Immediate Nak Arq in CSSDS File Delivery Protocol," Aerospace Conference 2003, Proceedings 2003 IEEE, vol. 3, pp. 31509-31523, Mar. 8, 2003.

*Chilean Office Action* for Application No. 610-06; 5 pages, Aug. 28, 2009.

*Chilean Office Action English Translation* for Application No. 610-06; 5 pages, Aug. 28, 2009.

*Australian Office Action* Communication, Application No. 2006227658, Ref. No. 21861RAY/MRR:kj, (2 pages), Oct. 23, 2009.

* cited by examiner

DATA HANDLING IN A DISTRIBUTED COMMUNICATION NETWORK

GOVERNMENT FUNDING

The U.S. Government may have certain rights in this invention as provided for by the terms of Contract No. 69792CDE9H awarded by the National Polar-Orbiting Operational Environmental Satellite System (NPOESS) Integrated Program Office (IPO).

TECHNICAL FIELD OF THE INVENTION

This invention relates generally to data communication and more particularly to data handling in a distributed communication network.

BACKGROUND

In a typical system for data communication according to one or more Consultative Committee for Space Data Systems (CCSDS) protocols, a single ground station receives data from a single data source (such as a spacecraft). A single facility (and possibly a backup facility) then processes the data. Data latency of up to approximately three hours often occurs in such a system. In the National Aeronautics and Space Administration's (NASA's) Earth Observing System (EOS), spacecraft communicate data through NASA's Space Network (also known as the Tracking and Data Relay Satellite System (TDRSS)) or through polar ground stations, usually on a once-per-orbit basis. In EOS, data is typically received in order and from only a single source.

SUMMARY

According to the present invention, disadvantages and problems associated with data communication may be reduced or eliminated.

In one embodiment, a system for data handling in a distributed communication network includes one or more data-handling nodes (DHNs) each residing at one of one or more centrals that are each operable to receive a stream of first data units from a routing system. The stream of first data units includes both stored mission data (SMD) and telemetry data having originated at one or more remote units. Each DHN is operable, in near real time, to remove redundant instances of first data units from the stream of first data units, properly order first data units in the stream of first data units received at the central out of order, remove misconfigured first data units from the stream of first data units, extract the SMD from the stream of first data units, generate second data units from the extracted SMD, and communicate a stream of the second data units to one or more interface data processors (IDPs).

Particular embodiments of the present invention may provide one or more technical advantages. As an example, particular embodiments reliably multiplex multiple CCSDS-encoded, high-rate data from multiple collection sites at near real time. Particular embodiments ensure proper ordering of data. Particular embodiments process multiple data streams that may contain overlapping or redundant data. Particular embodiments handle selectively encrypted data. Particular embodiments multiplex multiple high-rate CCSDS-encoded data streams into a single cohesive, nonredundant data stream in near real time, which may reduce latency in data delivery. Such reduction in latency in data delivery may enable missions employing multiple space-to-ground contacts per orbit. Particular embodiments are able to sort data communicated through multiple paths and remove redundancies in the data. Particular embodiments may order data from multiple streams into a single cohesive data stream, with no overlapping data. Particular embodiments may, when missing or corrupted data is encountered, notify a data monitoring subsystem, which may then find an optimal source to recover the missing or corrupted data.

Particular embodiments may facilitate DMR in a system for communicating data according to one or more CCSDS protocols. Particular embodiments may, in a communication system providing more or less real-time data communication, facilitate DMR without reducing a rate of communication through the communication system. Particular embodiments may provide reliable delivery of CCSDS-encoded, high-rate (such as between approximately twenty-five Mbps and 300 Mbps) data from multiple collection sites to multiple processing facilities. Particular embodiments may be substantially reliable and support high data-availability requirements. Particular embodiments may, in near real time, monitor raw data capture status, intermediate processing status, and product delivery status. Particular embodiments may facilitate automatic recovery of lost data in a timely manner. Particular embodiments may automatically select an optimal point in a data flow to retrieve lost data. Particular embodiments may provide near one hundred percent data availability. Particular embodiments may report statistics on missing data, delivered data, and recovered data.

Certain embodiments may provide all, some, or none of these technical advantages. Certain embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
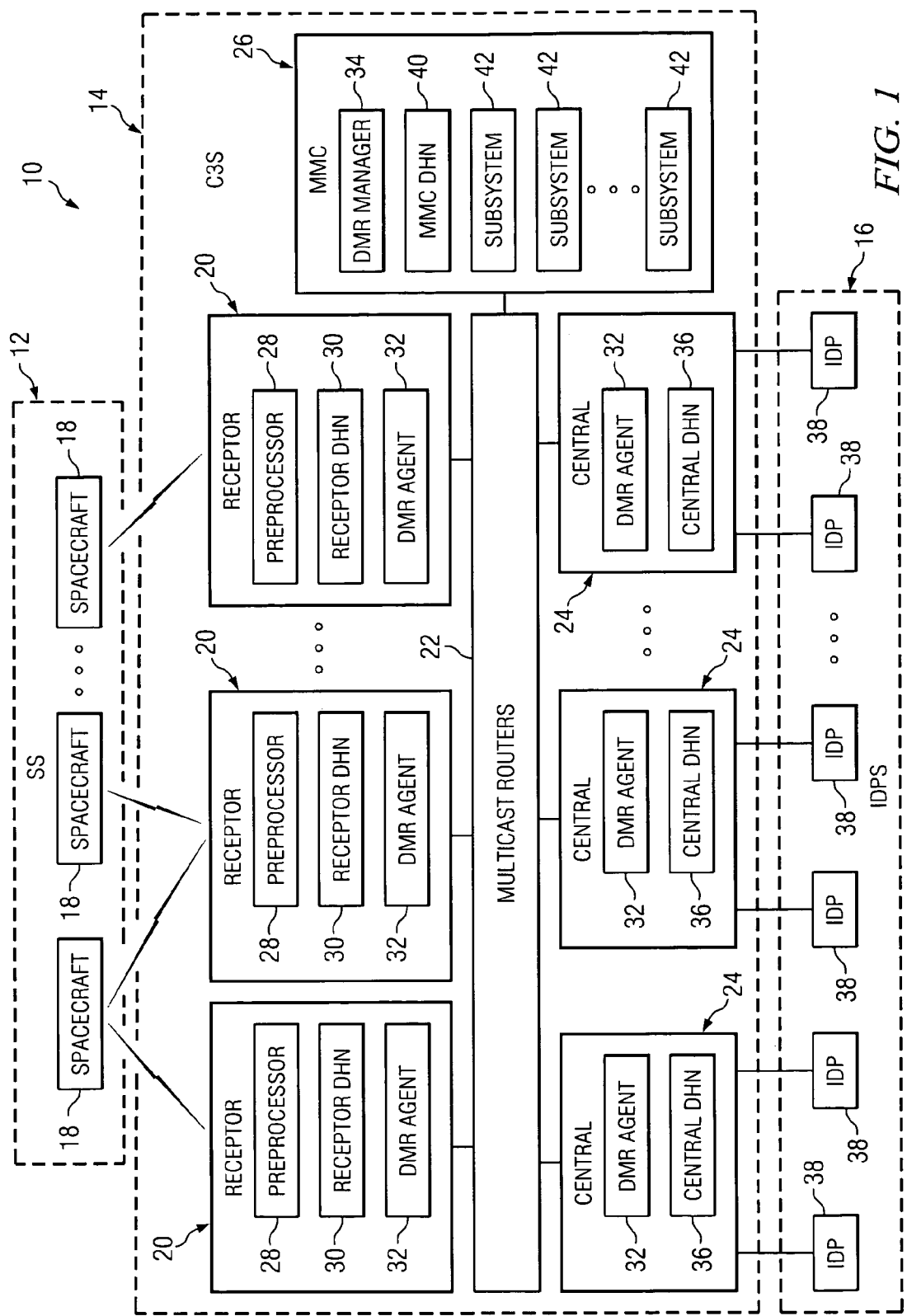
FIG. 1 illustrates an example system for data handling in a distributed communication network.

FIG. 1 illustrates an example system 10 for data handling in a distributed communication network. System 10 includes a space segment (SS) 12; a command, control, and communication segment (C3S) 14; and an interface data processor segment (IDPS) 16. SS 12 includes one or more spacecraft 18 that each generate data and communicate the data to C3S 14. A spacecraft 18 generates stored mission data (SMD) and telemetry data. In particular embodiments, SMD generated at a spacecraft 18 indicates one or more readings (such as one or more earth weather readings) collected at one or more sensors onboard spacecraft 18. In particular embodiments, telemetry data generated at a spacecraft 18 indicates a status (such as a last recorded value (LRV)) of each of one or more status points of spacecraft 18. One or more spacecraft 18 in SS 12 may be National Polar-Orbiting Operational Environmental Satellite System (NPOESS) spacecraft 18, and one or more spacecraft 18 in SS 12 may be NPOESS Prepatory Project (NPP) spacecraft 18. In particular embodiments, a spacecraft 18 automatically communicates data generated at spacecraft 18 to C3S 14 on a continuous basis or a periodic basis. In particular embodiments, a spacecraft 18 automatically communicates data generated at spacecraft 18 to C3S 14 in response to one or more particular events. In particular embodiments, a spacecraft 18 communicates data generated at spacecraft 18 to C3S 14 in response to particular instructions (such as one or more retransmit requests or other instructions) from C3S 14, as described below.

In particular embodiments, a spacecraft 18 organizes data generated at spacecraft 18 into application packets (APs) according to one or more CCSDS protocols and communicates one or more streams of APs to C3S 14. In particular embodiments, a particular AP stream corresponds to a particular application. A spacecraft 18 may communicate multiple AP streams to C3S 14 interleaved with each other. An AP includes an AP identification (APID) value and an AP sequence value. An APID value in an AP identifies an AP stream corresponding to the AP. As an example and not by way of limitation, consider a spacecraft 18 communicating a first AP stream and a second AP stream to C3S 14. Spacecraft 18 assigns all APs corresponding to the first AP stream an APID value identifying the first AP stream and assigns all APs corresponding to the second AP stream an APID value identifying the second AP stream. One or more components of C3S 14, IDPS 16, or both may use an APID value in an AP to identify an AP stream corresponding to the AP, as described below. In particular embodiments, system 10 accommodates up to 2048 APID values.

An AP sequence value in an AP indicates an order of the AP in an AP stream corresponding to the AP. As an example and not by way of limitation, consider a spacecraft 18 generating particular SMD that all corresponds to a particular application. Spacecraft 18 organizes a first portion of the SMD into a first AP and organizes a second portion of the SMD into a second AP. The first portion of the SMD immediately precedes the second portion of the SMD, and the second portion of the SMD immediately follows the first portion of the SMD. Spacecraft 18 assigns a first AP sequence value (such as 569) to the first AP and assigns a second AP sequence value (such as 570) to the second AP. The first AP sequence value indicates that the first AP immediately precedes the second AP, and the second AP sequence value indicates that the second AP immediately follows the first AP. One or more components of C3S 14, IDPS 16, or both may use an AP sequence value in an AP to determine an order of the AP in an AP stream corresponding to the AP, as described below.

In particular embodiments, a spacecraft 18 organizes APs generated at spacecraft 18 into virtual channel data units (VCDUs) according to one or more CCSDS protocols and communicates one or more streams of VCDUs to C3S 14. A VCDU includes 1020 bytes. In particular embodiments, a VCDU stream includes one or more AP streams. A spacecraft 18 may communicate multiple VCDU streams to C3S 14 interleaved with each other. A VCDU includes a virtual channel identification (VCID) value and a VCDU sequence value. A VCID in a VCDU identifies a virtual channel (VC) corresponding to the VCDU. A VC includes a stream of VCDUs. Reference to a VC or a VCDU stream may encompass a VC, a VCDU stream, or both, where appropriate. As an example and not by way of limitation, consider a spacecraft 18 communicating a first VCDU stream and a second VCDU stream to C3S 14. Spacecraft 18 assigns all VCDUs corresponding to the first VCDU stream a first VCID value identifying the first VCDU stream and assigns all VCDUs corresponding to the second VCDU stream a second VCID value identifying the second VCDU stream. One or more components of C3S 14 may use a VCID value in a VCDU to identify a VCDU stream corresponding to the VCDU, as described below. In particular embodiments, system 10 accommodates up to sixty-four VCID values.

A VCDU sequence value in a VCDU indicates an order of the VCDU in a stream of VCDUs. As an example and not by way of limitation, consider a spacecraft 18 that has generated an AP that exceeds a payload of a single VCDU but does not exceed a combined payload of two VCDUs. Spacecraft 18 organizes a first portion of the AP into a first VCDU and organizes a second portion of the AP into a second VCDU. The first portion of the AP immediately precedes the second portion of the AP, and the second portion of the AP immediately follows the first portion of the AP. Spacecraft 18 assigns a first VCDU sequence value (such as 4170) to the first VCDU and assigns a second VCDU sequence value (such as 4171) to the second VCDU. The first VCDU sequence value indicates that the first VCDU immediately precedes the second VCDU, and the second VCDU sequence value indicates that the second VCDU immediately follows the first VCDU. One or more components of C3S 14 may use a VCDU sequence value in a VCDU to determine an order of the VCDU in a VCDU stream corresponding to the VCDU, as described below.

In particular embodiments, a particular spacecraft 18 in SS 12 may use one or more particular VCs to communicate data to C3S 14. As an example and not by way of limitation, a first spacecraft 18 may use a first VC and a second VC to communicate data to C3S 14 and a second spacecraft 18 may use a third VC and a fourth VC to communicate data to C3S 14. One or more components in C3S 14 may use a VCID in a VCDU to identify a spacecraft 18 that generated the VCDU, as described below. In particular embodiments, a spacecraft 18 may use one or more first VCs to communicate SMD generated at spacecraft 18 to C3S 14 and use one or more second VCs to communicate telemetry data generated at spacecraft 18 to C3S 14. As an example and not by way of limitation, a spacecraft 18 may use a first VC and a second VC to communicate SMD generated at spacecraft 18 to C3S 14 and use a third VC and a fourth VC to communicate telemetry data generated at spacecraft 18 to C3S 14. One or more components of C3S 14 may use a VCID in a VCDU to determine whether the VCDU includes SMD or telemetry data, as described below.

In particular embodiments, a spacecraft 18 organizes a VCDU generated at spacecraft 18 into a channel access data unit (CADU) according to one or more CCSDS protocols for communication to C3S 14. A CADU includes 1024 bytes. A CADU includes an encoded VCDU, approximately four bytes for frame synchronization, and one hundred twenty-eight bits for error correction (which may include Reed-Solomon error correction) for decoding the encoded VCDU.

In particular embodiments, C3S 14 includes one or more receptors 20, one or more multicast routers 22, one or more centrals 24, and a mission management center (MMC) 26. Components of C3S 14 may be coupled to each other using one or more links that each include one or more computer buses, local area networks (LANs), metropolitan area networks (MANs), wide area networks (WANs), portions of the Internet, or any other suitable wireline, optical, wireless, or other links.

Receptors 20 receive data from spacecraft 18 in SS 12 and communicate the data to multicast routers 22. A receptor 20 may receive data from a spacecraft 18 using a satellite link between receptor 20 and spacecraft 18. In particular embodiments, one or more receptors 20 in C3S 14 are unmanned. In particular embodiments, one or more receptors 20 in C3S 14 include a manned ground station. A receptor 20 that includes a manned ground station may be more expensive to operate than an unmanned receptor 20. In particular embodiments, receptors 20 are globally distributed. As an example and not by way of limitation, C3S 14 may include a first receptor 20 at McMurdo, Antarctica; a second receptor 20 at Santiago, Chile; a third receptor 20 at Pearl City, Hi.; a fourth receptor 20 at Seoul, South Korea; a fifth receptor 20 at San Diego, Calif.; a sixth receptor 20 at Auckland, New Zealand; a seventh receptor 20 at Anchorage, Ak.; an eighth receptor 20 at Bombay, India; a ninth receptor 20 at Nimitz Hill, Guam; a tenth receptor 20 at Orlando, Fla.; an eleventh receptor 20 at Johannesburg, South Africa; a twelfth receptor 20 at Sao Paulo, Brazil; a thirteenth receptor 20 at Melbourne, Australia; a fourteenth receptor 20 at Helsinki, Finland; a fifteenth receptor 20 at Frankfurt, Germany; a sixteenth receptor 20 at Svalbard, Sweden; and a seventeenth receptor 20 at Fairbanks, Alk. In particular embodiments, one or more particular receptors 20 in C3S 14 may receive data only from NPOESS spacecraft 18. In particular embodiments, one or more particular receptors in C3S 14 may receive data only from NPP spacecraft 18.

In particular embodiments, a receptor 20 includes one or more receivers (such as one or more antennae) for receiving data from spacecraft 18 in SS 12. In particular embodiments, receptor 20 also includes a preprocessor 28, a receptor data-handling node (DHN) 30, and a DMR agent 32. A component of receptor 20 may include one or more hardware, software, or embedded-logic components or a combination of two or more such components. Components of receptor 20 may be coupled to each other using one or more links that each include one or more computer buses, LANs, MANs, WANs, portions of the Internet, or any other suitable wireline, optical, wireless, or other links. Preprocessor 28 extracts VCDUs from CADUs received at receptor 20 and adds extensions to the VCDUs to generate extended VCDUs (EVCDUs). An extension in an EVCDU may include metadata that one or more components of C3S 14 may use to track the EVCDU through C3S 14. Reference to a VCDU or an EVCDU may encompass a VCDU, an EVCDU, or both, where appropriate. In particular embodiments, preprocessor 28 causes VCDUs received at receptor 20 to be stored locally at receptor 20. In particular embodiments, preprocessor 28 also decodes data from SS 12, synchronizes frames of data from SS 12, and corrects errors in data from SS 12 according to a Reed-Solomon or other error correction technique. In particular embodiments, preprocessor 28 generates log files of EVCDUs generated at preprocessor 28 and communicates the EVCDU log files to DMR agent 32 at receptor 20.

In particular embodiments, receptor DHN 30 provides one or more of the functionalities associated with preprocessor 28 described above. As an example and not by way of limitation, receptor DHN 30 may extract VCDUs from CADUs received at receptor 20, add extensions to VCDUs extracted at receptor 20 to generate EVCDUs, cause EVCDUs generated at receptor 20 to be communicated to multicasting routers 22, cause EVCDUs generated at receptor 20 to be stored locally at receptor 20, generate log files of EVCDUs generated at receptor 20, and communicate EVCDU log files generated at receptor DHN 30 to DMR agent 32 at receptor 20, while preprocessor 28 may decode data from SS 12, synchronize frames of data from SS 12, and correct errors in data from SS 12 according to a Reed-Solomon or other error correction technique.

In particular embodiments, receptor DHN 30 includes automatic failure-recovery functionality that, if a failure occurs at receptor DHN 30, detects the failure and restarts one or more processes of receptor DHN 30 in response to the failure. The automatic failure-recovery functionality may restart the processes at one or more first computer systems that were previously executing the processes or at one or more second computer system that were not previously executing the processes. In particular embodiments, receptor DHN 30 is a distributed system executed at multiple computer systems.

DMR agent 32 generates tracking statistics from EVCDU log files and, using the tracking statistics, generates tracking reports for a DMR manager 34 at MMC 26. In particular embodiments, DMR agent 32 receives EVCDU log files from preprocessor 28. In particular embodiments, DMR agent 32 accesses data stored locally at receptor 20 (such as EVCDUs generated at receptor 20) and generates EVCDU log files that DMR agent 32 then uses to generate tracking statistics. A tracking report from DMR agent 32 identifies VCDUs received at receptor 20 and VCDUs that should have been received at receptor 20, but were not. A tracking report may identify VCDUs according to VCID value and VCDU sequence value. As an example and not by way of limitation, consider receptor 20 receiving a VCDU stream. Receptor 20 receives VCDUs corresponding to the EVCDU stream having VCDU sequence values 3260 through 3510. Receptor 20 then, without receiving VCDUs corresponding to the EVCDU stream having VCDU sequence values 3511 through 3689, receives VCDUs corresponding to the VCDU stream having VCDU sequence values 3690 through 4171. DMR agent 32 generates a tracking report that indicates that receptor 20 received VCDUs corresponding to the VCDU stream having VCDU sequence values 3260 through 3510 and 3690 through 4171. The gap between VCDU sequence values 3510 and 3690 may indicate that receptor 20 should have received VCDUs corresponding to the VCDU stream having sequence values 3511 through 3689, but did not.

In particular embodiments, DMR agent 32 responds to retransmit requests from DMR manager 34. In response to a retransmit request from DMR manager 34, DMR agent 32 may access one or more particular EVCDUs stored locally at receptor 20 and communicate the one or more particular EVCDUs to one or more centrals 24, as described below. In response to a retransmit request from DMR manager 34, DMR agent 32 may cause preprocessor 28, receptor DHN 30 or both to access one or more particular EVCDUs stored locally at receptor 20 and communicate the one or more particular EVCDUs to one or more centrals 24, as described below. Receptor 20 may communicate data from SS 12 to multicast routers 22 in approximate real time, and DMR agent 32 may operate outside an approximately real-time data path through receptor 20. As a result, DMR agent 32 may, without substantially reducing a rate of data communication through receptor 20, facilitate DMR operations that involve receptor 20.

In particular embodiments, multicast routers 22 include one or more continental U.S. (CONUS) multicast gateway or other routers. Multicast routers 22 receive EVCDUs from each receptor 20 and, using a multicasting protocol, communicate the EVCDUs to each central 24 and to MMC 26 so that each central 24 and MMC 26 receive EVCDUs from each receptor 20. Although multicast routers 22 are described and illustrated as multicasting data from receptors 20 to centrals 24 and MMC 26, the present invention also contemplates multicast routers 22 unicasting or broadcasting data from receptors 20 to centrals 24 and MMC 26, according to particular needs.

In particular embodiments, a central 24 includes a DMR agent 32 and a central DHN 36. A component of central 24 may include one or more hardware, software, or embedded-logic components or a combination of two or more such components. Components of central 24 may be coupled to each other using one or more links that each include one or more computer buses, LANs, MANs, WANs, portions of the Internet, or any other suitable wireline, optical, wireless, or other links. Central 24 receives EVCDU streams from multicast routers 22 and processes EVCDUs in the EVCDU streams for communication to IDPS 16, as described below.

Central 24 may receive a redundant instance of an EVCDU. As an example and not by way of limitation, central 24 may receive a first instance and of an EVCDU and a second, redundant instance of the EVCDU as a result of a spacecraft 18 communicating the EVCDU to two receptors 20. If central 24 receives a redundant instance of an EVCDU, central DHN 36 detects the redundancy and withholds contents of the redundant instance of the EVCDU from communication to IDPS 16. In particular embodiments, central DHN 36, without communicating contents of the redundant instance of the EVCDU to IDPS 16, causes the redundant instance of the EVCDU to be stored at central 24.

In particular embodiments, central DHN 36 use a high-water mark to detect redundant instances of EVCDUs corresponding to a VC. A high-water mark for detecting redundant instances of EVCDUs corresponding to a VC includes a counter indicating an EVCDU sequence value of a last EVCDU received at central 24 corresponding to the VC. Central DHN 36 updates the high-water mark as central 24 receives EVCDUs corresponding to the VC. In particular embodiments, when central 24 receives a first instance of an EVCDU corresponding to a VC, central DHN 36 accesses an EVCDU sequence value in the first instance of the EVCDU and compares the EVCDU sequence value with a high-water mark at central 24 corresponding to the VC. If the EVCDU sequence value in the first instance of the EVCDU is at or below the high-water mark, central DHN 36 concludes that central 24 has already received one or more second instances of the EVCDU and that the first instance of the EVCDU is a redundant instance of the EVCDU. Central DHN 36 may then, without communicating contents of the first instance of the EVCDU to IDPS 16, cause the first instance of the EVCDU to be stored at central 24. If the EVCDU sequence value in the first instance of the EVCDU is above the high-water mark, DHN central 34 concludes that central 24 has not previously received one or more second instances of the EVCDU. Central DHN 36 then updates the high-water mark to correspond to the EVCDU sequence value in the first instance of the EVCDU and may communicate contents of the first instance of the EVCDU to IDPS 16. In particular embodiments, central DHN 36 stores a high-water mark in persistent memory at central DHN 36 so that, if central DHN 36 is restarted, the high-water mark may be recovered.

Central 24 may receive EVCDUs corresponding to a VC out of order. As an example and not by way of limitation, consider a spacecraft 18 generating a first VCDU corresponding to a VC and communicating the first VCDU to a first receptor 20 and then generating a second VCDU corresponding to the VC and communicating the second VCDU to a second receptor 20. A first delay is associated with communicating data from first receptor 20 to central 24, and a second delay that is less than the first delay is associated with communicating data from second receptor 20 to central 24. Because the second delay is less than the second delay, central 24 receives the second VCDU before the first VCDU.

When central 24 receives EVCDUs corresponding to a VC out of order, central DHN 36 may order the EVCDUs according to VCDU sequence value. As an example and not by way of limitation, consider a spacecraft 18 generating a first VCDU corresponding to a VC and communicating the first VCDU to a first receptor 20, then generating a second VCDU corresponding to the VC and communicating the second VCDU to first receptor 20, and then generating a third VCDU corresponding to the VC and communicating the third VCDU to a second receptor 20. The first VCDU includes a first VCDU sequence value, the second VCDU includes a second VCDU sequence value, and the third VCDU includes a third VCDU sequence value. Central 24 receives the first VCDU before the second and third VCDUs, but, because of delays associated with communicating data from first receptor 20 to central 24 that are not associated with communicating data from second receptor 20 to central 24, receives the third VCDU before the second VCDU.

When central 24 receives the first VCDU, central DHN 36 accesses and records the first VCDU sequence value. Central DHN 36 may then communicate contents of the first VCDU to IDPS 16. When central 24 receives the third VCDU, central DHN 36 accesses the third VCDU sequence value and compares the third VCDU sequence value with the first VCDU sequence that was recorded when central 24 received the first VCDU. From the comparison, central DHN 36 concludes that the third VCDU does not immediately follow the first VCDU. Because the third VCDU does not immediately follow the first VCDU, central DHN 36 may cause the third VCDU to be stored locally at central 24 for later communication of contents of the third VCDU to IDPS 16. When central 24 receives the second VCDU, central DHN 36 accesses the second VCDU sequence value and compares the second VCDU sequence value with the first VCDU sequence value that was recorded when central 24 received the first VCDU. From the comparison, central DHN 36 concludes that the second VCDU immediately follows the first VCDU. Because the second VCDU immediately follows the first VCDU, central DHN 36 records the second VCDU sequence value and may then communicate contents of the second VCDU to IDPS 16. Central 36 then accesses the third VCDU stored locally at central 24 and records the third VCDU sequence value and may then communicate contents of the third VCDU to IDPS 16.

Central 24 may receive misconfigured EVCDUs. An EVCDU may be misconfigured, for example, as a result of a spacecraft 18 assigning an incorrect VCID to the VCDU when spacecraft 18 generates the VCDU. When central 24 receives an EVCDU, central DHN 36 determines whether the EVCDU is misconfigured. If the EVCDU is misconfigured, central DHN 36 may, without communicating contents of the EVCDU to IDPS 16, discard the EVCDU. In particular embodiments, to determine whether an EVCDU is misconfigured, central DHN 36 accesses a VCID, a spacecraft ID, and an Internet Protocol (IP) address in the EVCDU and determine whether the VCID, the spacecraft ID, and the IP address are a valid combination of VCID, spacecraft ID, and IP address. To determine whether the VCID, the spacecraft ID, and the IP address are a valid combination of VCID, spacecraft ID, and IP address, central DHN 36 compares the VCID, the spacecraft ID, and the IP address in the EVCDU with data at central 24 indicating valid combinations of VCIDs, spacecraft IDs, and IP addresses. If central DHN 36 determines from the comparison that the VCID, the spacecraft ID, and the IP address in the EVCDU are a valid combination of VCID, spacecraft ID, and IP address, central DHN 36 may communicate contents of the EVCDU to IDPS 16. If central DHN 36 determines from the comparison that the VCID, the spacecraft ID, and the IP address in the EVCDU are not a valid combination of VCID, spacecraft ID, and IP address, central DHN 36 may, without communicating contents of the EVCDU to IDPS 16, discard the EVCDU. Components in system 10 may use an IP address in an EVCDU to route the EVCDU through system 10. In particular embodiments, an IP address in an EVCDU may correspond to a multicast group.

In particular embodiments, central 24 receives multiple VCs interleaved with each other from multicast routers 22. As described above, first EVCDUs in one or more first VCs may include SMD and second EVCDUs in one or more second VCs may include telemetry data. When central 24 receives an EVCDU, central DHN 36 may determine whether the EVCDU includes SMD. If the EVCDU includes SMD, central DHN 36 may extract an AP or a portion of an AP from the EVCDU for communication to an interface data processor (IDP) 38 in IDPS 16. In particular embodiments, if the EVCDU does not include SMD, central DHN 36 may, without extracting an AP or a portion of an AP from the EVCDU for communication to an IDP 38 in IDPS 16, cause the EVCDU to be stored at central 24. In particular embodiments, to determine whether an EVCDU includes SMD, central DHN 36 accesses a VCID in the EVCDU and compares the VCID with data at central 24 identifying VCs used to communicate SMD. If the EVCDU corresponds to a VC used to communicate SMD, central DHN 36 concludes that the EVCDU includes SMD. If the EVCDU does not correspond to a VC used to communicate SMD, central DHN 36 concludes that the EVCDU does not include SMD.

In particular embodiments, central DHN 36 adds an extension to an AP extracted from one or more EVCDUs received at central 24 to generate an extended AP (EAP). In particular embodiments, an extension in an EAP includes metadata that one or more components of system 10 may use to track the EAP through system 10, route the EAP through system 10, or both. Reference to an AP or an EAP may encompass an AP, an EAP, or both, where appropriate. Central DHN 36 communicates EAPs generated at central DHN 36 to an IDP 38 for back-end processing. In particular embodiments, central DHN 36 generates log files of EAPs generated at central DHN 36 and communicate the EAP log files to DMR agent 32 at central 24. In particular embodiments, central DHN 36 generates log files of EVCDUs received at central 24 and communicates the EVCDU log files to DMR agent 32 at central 24.

In particular embodiments, central DHN 36 manages files stored locally at central 24. In particular embodiments, files stored locally at central 24 include one or more of tracking reports generated at central 24, EVCDU log files generated at central 24, EAP log files generated at central 24, EVCDUs received at central 24, and EAPs generated at central 24. Managing files stored locally at central 24 may include copying particular files stored locally at central 24 to global storage accessible to one or more other components of system 10. Managing files stored locally at central 24 may also include deleting particular files stored locally at central 24. Central DHN 36 determines whether to copy a file stored locally at central 24 to global storage according to one or more criteria. In particular embodiments, as an example and not by way of limitation, central DHN 36 copies a file stored locally at central 24 to global storage if the file includes particular data. In particular embodiments, central DHN 36 copies a file stored locally at central 24 to global storage if the file includes one or more tracking reports, EVCDU log files, or EVCDUs.

Central DHN 36 also determines whether to delete a file stored locally at central 24 according to one or more criteria. In particular embodiments, as an example and not by way of limitation, central DHN 36 deletes a file stored locally at central 24 if an amount of time that the file has been stored at central 24 reaches a predetermined threshold. In particular embodiments, as another example, central DHN 36 monitors an available amount of local storage at central 24 and, if the available amount of local storage at central 24 drops below a predetermined threshold, deletes particular files to bring the amount of available local storage at central 24 back up to the predetermined threshold. When central DHN 36 deletes particular files to bring the amount of available local storage at central 24 back up to the predetermined threshold, central DHN 36 may delete an oldest (in terms of an amount of time the file has been stored at central 24) file first, a second-oldest file second, a third-oldest file third, and so on, until the amount of available local storage at central 24 reaches the predetermined threshold.

In particular embodiments, central DHN 36 includes automatic failure-recovery functionality that, if a failure occurs at central DHN 36, detects the failure and restarts one or more processes of central DHN 36 in response to the failure. The automatic failure-recovery functionality may restart the processes at one or more first computer systems that were previously executing the processes or at one or more second computer system that were not previously executing the processes. In particular embodiments, central DHN 36 is a distributed system executed at multiple computer systems.

DMR agent 32 at central 24 generates tracking statistics from EVCDU log files and, using the tracking statistics, generates tracking reports for DMR manager 34. In particular embodiments, DMR agent 32 receives EVCDU log files from central DHN 36. In particular embodiments, DMR agent 32 accesses data stored locally at central 24 (such as EVCDUs received at central 24) and generates EVCDU log files that DMR agent 32 then uses to generate tracking statistics. A tracking report from DMR agent 32 identifies EVCDUs received at central 24 and EVCDUs that should have been received at central 24, but were not. A tracking report may identify EVCDUs according to VCID value and VCDU sequence value. As an example and not by way of limitation, consider central 24 receiving an EVCDU stream. Central 24 receives EVCDUs corresponding to the EVCDU stream having VCDU sequence values 3260 through 3510. Central 24 then, without receiving EVCDUs corresponding to the EVCDU stream having VCDU sequence values 3511 through 3689, receives EVCDUs corresponding to the EVCDU stream having VCDU sequence values 3690 through 4171. DMR agent 32 generates a tracking report that indicates that central 24 received EVCDUs corresponding to the EVCDU stream having VCDU sequence values 3260 through 3510 and 3690 through 4171. The gap between VCDU sequence values 3510 and 3690 may indicate that central 24 should have received EVCDUs corresponding to the EVCDU stream having sequence values 3511 through 3689, but did not.

In particular embodiments, DMR agent 32 also generates delivery statistics from log files of EAPs generated at central 24 and, using the delivery statistics, generates delivery reports for DMR manager 34. In particular embodiments, DMR agent 32 receives EAP log files from central DHN 36. In particular embodiments, DMR agent 32 accesses data stored locally at central 24 (such as EAPs received at central 24) and generates EAP log files that DMR agent 32 then uses to generate delivery statistics. A delivery report from DMR agent 32 identifies APs received at central 24 and APs that should have been received at central 24, but were not. A delivery report may identify APs according to APID value and AP sequence value. As an example and not by way of limitation, consider central 24 receiving an AP stream. Central 24 receives APs corresponding to the AP stream having AP sequence values thirty-four through thirty-nine. Central 24 then, without receiving APs corresponding to the AP stream having AP sequence values forty through forty-two, receives APs corresponding to the AP stream having AP sequence values and forty-three through fifty. DMR agent 32 subsequently generates a delivery report that indicates that central 24 received APs corresponding to the AP stream having AP sequence values thirty-four through thirty-nine and forty-three through fifty. The gap between AP sequence values thirty-nine and forty-three may indicate that central 24 should have received APs corresponding to the AP stream having sequence values forty through forty-two, but did not.

In particular embodiments, DMR agent 32 responds to retransmit requests from DMR manager 34. In response to a retransmit request from DMR manager 34, DMR agent 32 may access one or more particular EVCDUs stored locally at central 24 and communicate the one or more particular EVCDUs to one or more other centrals 24. In response to a retransmit request from DMR manager 34, DMR agent 32 may cause central DHN 36 to access one or more particular EVCDUs stored locally at central 24 and communicate the one or more particular EVCDUs to one or more other centrals 24. Central 24 may communicate data from multicast routers 22 to an IDP 38 in approximate real time, and DMR agent 32 may operate outside an approximately real-time data path through central 24. As a result, DMR agent 32 may, without substantially reducing a rate of data communication through receptor 20, facilitate DMR operations that involve receptor 20.

In particular embodiments, DMR agents 32 may receive and respond to bandwidth-control signals from MMC 26 or other suitable component of C3S 14. Bandwidth-control signals may be used to dynamically control bandwidth used to recover missing data, which may provide more efficient usage of available bandwidth and enable implementation of priorities between first-copy delivered data and retransmitted data.

In particular embodiments, MMC 26 includes DMR manager 34, an MMC DHN 40, and one or more subsystems 42. A component of MMC 26 may include one or more hardware, software, or embedded-logic components or a combination of two or more such components. Components of MMC 26 may be coupled to each other using one or more links that each include one or more computer buses, LANs, MANs, WANs, portions of the Internet, or any other suitable wireline, optical, wireless, or other links. MMC 26 receives EVCDU streams from multicast routers 22, and MMC DHN 40 processes EVCDUs in the EVCDU streams for communication to subsystems 42, as described below.

DMR manager 34 receives tracking reports and delivery reports from DMR agents 32 and stores the reports at MMC 26 using an open database connectivity (ODBC) or other suitable database. In particular embodiments, DMR manager 34 compiles tracking reports into a tracking record identifying EVCDUs received at each receptor 20 and each central 24. Reference to a tracking report or a tracking record may encompass a tracking report, a tracking record, or both, where appropriate. DMR manager 34 queries the database to identify any APs that should have been received at a central 24, but were not. If DMR manager 34 identifies a missing AP, DMR manager 34 maps the missing AP to one or more EVCDUs, determines a best source for each of the EVCDUs, and generates one or more retransmit requests, as described below. Reference to an AP may encompass an AP or a portion of an AP, where appropriate. In particular embodiments, DMR manager 34, automatically and without user input, queries the database periodically or in response to one or more events. In particular embodiments, DMR manager 34 queries the database in response to user input.

As an example and not by way of limitation, consider a delivery report from a first DMR agent 32 at a first central 24 indicating that (1) first central 24 should have received, but did not receive, APs having APID twenty-four and AP sequence values forty through forty-two and (2) the missing APs are in EVCDUs having VCID fourteen and VC sequence values 3511 through 3689. DMR manager 34 receives the delivery report and identifies the missing APs and the EVCDUs that the missing APs are in. DMR manager 34 then accesses a tracking record at MMC 26 to identify one or more components of C3S 14 that received the EVCDUs. If one or more components of C3S 14 received the EVCDUs, DMR manager 34 selects, from among the components of C3S 14 that received the EVCDUs, one or more best sources for retransmission of the EVCDUs to first central 24. A best source for retransmission of the EVCDUs includes a component closest to IDPS 16 that received the EVCDUs. As an example and not by way of limitation, if a second central 24 received the EVCDUs, second central 24 is a best source for retransmission. If a second central 24 did not receive the EVCDUs, but a receptor 20 did, receptor 20 is a best source for retransmission. If DMR manager 34 selects one or more best sources in C3S 14 for retransmission of the EVCDUs to first central 24, DMR manager 34 then generates one or more retransmit requests for communication to the best sources. DMR manager 34 communicates the retransmit requests, and, in response to the retransmit requests, the best sources retransmit the EVCDUs to first central 24, as described above. If neither a second central 24 nor a receptor 20 has stored copies of the EVCDUs, a spacecraft 18 may be a best source for retransmission. If DMR manager 34 determines that one or more particular spacecraft 18 need to retransmit one or more VCDUs, DMR manager 34 may communicate a retransmit request to CMD uplink 36 for communication to spacecraft 18.

In particular embodiments, before generating a new retransmit request, DMR manager 34 may determine whether the new retransmit request would overlap or be at least substantially adjacent a currently pending retransmit request. If so, DMR manager 34 may, instead of generating the new retransmit request, modify the already pending retransmit request to include the new retransmit request. As an example and not by way of limitation, consider a first, currently pending retransmit request to a particular receptor 20 to retransmit, to a particular central 24, EVCDUs having VCID fourteen and EVCDU sequence values 3511 through 3689. While the first retransmit request is pending, DMR manager 34 determines that receptor 20 also needs to retransmit, to central 24, EVCDUs having VCID fourteen and EVCDU sequence values 3690 through 3815. DMR manager 34 may then, instead of generating a second retransmit request, modify the first retransmit request to include EVCDUs having VCID fourteen and EVCDU sequence values 3690 through 3815. In addition, if two or more retransmit requests for missing data from two or more centrals 24 would overlap or be at least substantially adjacent each other such that a single recovery operation could recover the missing data, DMR manager 34 may concatenate the retransmit requests to each other. Concatenating particular retransmit requests to each other may facilitate avoiding multiple recovery operations directed to data that could be recovered in a single recovery operation, which may reduce bandwidth requirements associated with recovery operations in system 10. By concatenating particular retransmit requests to each other, DMR manager 34 may effectively control multicast of retransmitted data. In particular embodiments, DMR agents 32 and DMR manager 32 run automatically and do not require user input from operations personnel. One or more subsystems 42 of MMC 26 may include an enterprise-management component. DMR manager 34 may communicate, to the enterprise-management component, information regarding data statistics, retransmission activity, and DMR operational status.

In particular embodiments, MMC 26 receives multiple VCs interleaved with each other from multicast routers 22. As described above, first EVCDUs in one or more first VCs may include SMD and second EVCDUs in one or more second VCs may include telemetry data. Telemetry data from a spacecraft 18 may include real-time telemetry data. Telemetry data from a spacecraft 18 may include playback telemetry data. Telemetry data from a spacecraft 18 may include stored telemetry data. Real-time telemetry data includes telemetry data generated at spacecraft 18 and communicated to C3S 14 while spacecraft 18 has a telemetry and CMD link to C3S 14. In particular embodiments, spacecraft 18 has a telemetry and CMD link to C3S 14 once an orbit. When MMC 26 receives an EVCDU, MMC DHN 40 may determine whether the EVCDU includes telemetry data. If the EVCDU includes telemetry data, MMC DHN 40 may extract the telemetry data from the EVCDU for communication to one or more subsystems 42. In particular embodiments, if the EVCDU does not include telemetry data, MMC DHN 40 may, without extracting any data from the EVCDU, cause the EVCDU to be stored at MMC 26. To determine whether an EVCDU received at MMC 26 includes telemetry data for extraction, MMC DHN 42 may access one or more portions of the EVCDU indicating whether the EVCDU includes telemetry data. As an example and not by way of limitation, MMC DHN 42 may access a VCID in the EVCDU and compare the VCID with data at MMC 26 identifying VCs used to communicate telemetry data. If the EVCDU corresponds to a VC used to communicate telemetry data, MMC DHN 40 may conclude that the EVCDU includes telemetry data. If the EVCDU does not correspond to a VC used to communicate telemetry data, central DHN 36 may conclude that the EVCDU does not include telemetry data.

MMC DHN 40 may communicate extracted telemetry data to one or more subsystems 42 of MMC 26. In particular embodiments, MMC DHN 40 multicasts extracted telemetry data to multiple subsystems 42, according to particular needs. MMC DHN 40 may communicate telemetry data to one or more telemetry subsystems 42 of MMC 26 (such as one or more Satellite Telemetry Analysis (STA) subsystems) or one or more CMD subsystems 42 of MMC 26 (such as one or more Satellite Operations (SO) subsystems). One or more such subsystems 42 may analyze received telemetry data and, based on analysis of the telemetry data, generate CMDs for communication to spacecraft 18 in SS 12. In particular embodiments, MMC DHN 40 may access one or more portions of the telemetry data to determine which subsystems 42 of MMC 26 should receive telemetry data. MMC DHN 40 may then communicate the telemetry data to those subsystems 42 of MMC 26.

In particular embodiments, MMC DHN 40 includes automatic failure-recovery functionality that, if a failure occurs at MMC DHN 40, detects the failure and restarts one or more processes of MMC DHN 40 in response to the failure. The automatic failure-recovery functionality may restart the processes at one or more first computer systems that were previously executing the processes or at one or more second computer system that were not previously executing the processes. In particular embodiments, MMC DHN 40 is a distributed system executed at multiple computer systems.

IDPS 16 may include one or more IDPs 38. An IDP 38 may include one or more stations including one or more hardware components, software components, or embedded logic components or a combination of two or more such components for back-end processing of data generated at one or more sensors of one or more spacecraft 18. As an example and not by way of limitation, IDP 38 may include one or more stations for interpreting or otherwise making use of information (such as one or more earth weather readings or other information) collected at one or more sensors of one or more spacecraft 18. In particular embodiments, a first IDP 38 may be associated with the National Oceanic and Atmospheric Administration's (NOAA's) National Environmental Satellite, Data, and Information Service (NESDIS); a second IDP 38 may be associated with the U.S. Air Force's Air Force Weather Agency (AFWA); a third IDP 38 may be associated with the U.S. Navy's Feet Numerical and Oceanography Center (FNMOC); and a fourth IDP 38 may be associated with the U.S. Navy's Naval Oceanographic Office (NAVO). First, second, third, and fourth IDPs 38 may each be associated with a particular central 24 in C3S 14. A central 24 may be coupled to an IDP 38 using one or more links that may each include one or more computer buses, LANs, MANs, WANs, portions of the Internet, or any other appropriate wireline, optical, wireless, or other links.

IDPS 16 may communicate with DMR manager 34. In particular embodiments, IDPS 16 may communicate retransmit requests to DMR manager 34. DMR manager 28 may, in response to a first retransmit request from IDPS 16, communicate a request acknowledgement to an IDP 40 in IDPS 16 that generated the retransmit request and cause one or more VCDUs to be retransmitted, as described above. DMR manager 28 may also communicate to IDP 40 information regarding retransmission activity with respect to the retransmit request. To enable communication between DMR manager 34 and one or more IDPs 40 in IDPS 16, MMC 26 may be coupled to IDPS 16 using one or more links that may each include one or more computer buses, LANs, MANs, WANs, portions of the Internet, or any other appropriate wireline, optical, wireless, or other links.

According to one or more CCSDS protocols, multiple APs that are related to each other may be identified together as a segmented packet set. One or more fields in the headers of those APs may indicate where the APs belong in the segmented packet set. As an example and not by way of limitation, consider a segmented packet set that includes first, second, and third APs. One or more fields in the header of the first AP indicate that the first AP is first in the segmented packet set, one or more fields in the header of the second AP indicate that the second AP is second in the segmented packet set, and one or more fields in the header of the third AP indicate that the third AP is third in the segmented packet set. Since APs may have a maximum size of 64 kilobytes, such fields may facilitate file transfers, sensor scans, memory dumps, and other operations involving more than 64 kilobytes of data.

In particular embodiments, when a missing AP that is part of a segmented packet set is recovered, all other APs that are part of the segmented packet set are also recovered. As an example and not by way of limitation, when DMR manager 34 determines that an AP should have been received at a component in C3S 14, but was not, DMR manager 34 may determine whether the missing AP is part of a segmented packet set. If DMR manager 34 determines that the missing AP is part of a segmented packet set, DMR 38 may identify the other APs in the segmented packet set and include those other APs in the retransmit request for the missing AP. Accordingly, when the missing AP eventually reaches one or more IDPs 40, the missing AP reaches the IDPs 40 along with the other APs in the missing AP's segmented packet set.

Figure 2:
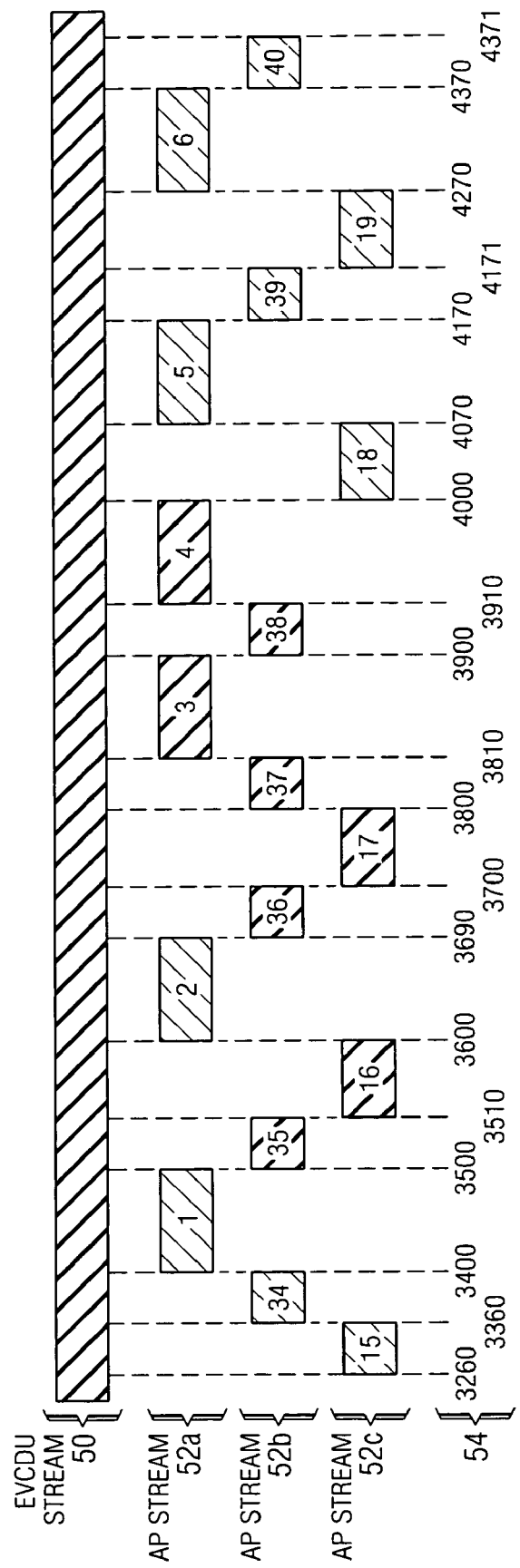
FIG. 2 illustrates example data communicated in the system illustrated in FIG. 1.

FIG. 2 illustrates example data communicated in system 10. EVCDU stream 50 includes three AP streams 52 and has a particular VCID. The EVCDUs in EVCDU stream 50 are sequential EVCDUs that each have an EVCDU sequence value 54. AP stream 52a has a first APID, and the APs in AP stream 52a are sequential APs that each have an AP sequence value. AP stream 52b has a second APID, and the APs in AP stream 52b are sequential APs that each have an AP sequence value. AP stream 52c has a third APID, and the APs in AP stream 52a are sequential APs that each have an AP sequence value. In FIG. 2, APs are generally positioned with respect to EVCDU stream 50 according to the EVCDU sequence values 54 of the EVCDUs that contain the APs. EVCDUs 4070 through 4170 contain AP five of AP stream 52a, EVCDUs 3360 through 3400 contain AP thirty-four of AP stream 52b, EVCDUs 3700 through 3800 contain AP seventeen of AP stream 52c, and so on. Although the boundaries of APs are illustrated and described as lining up with the boundaries of EVCDUs, such boundaries may not necessarily line up with each other. Such boundaries are described and illustrated as lining up with each merely to simplify explanation of the present invention.

DMR manager 34 may receive, from a DMR agent 32 at a central 24, a delivery report indicating that a central DHN 36 at central 24 should have received the following APs, but did not: APs three and four of AP stream 52a; APs thirty-five through thirty-eight of AP stream 52b; and AP sixteen and seventeen of AP stream 52c. In addition or as an alternative, DMR manager 34 may receive a retransmit request from one or more IDPs 40 indicating that IDPs 40 should have received the APs, but did not. DMR manager 34 may then access one or more tracking reports from one or more DMR agents 32 to determine what EVCDUs need to be retransmitted to central 24. From the tracking reports, DMR manager 34 may determine that EVCDUs 3500 through 3560 and 3690 through 4000 contain the missing APs and need to be retransmitted. Although retransmit requests from IDPs 40 are described and illustrated, an IDP 40 may, in particular embodiments, rely on DMR manager 34 to detect missing data and request retransmission of the missing data automatically and without IDP 40 requesting such retransmission. An IDP 40 may, however, communicate a retransmit request to DMR manager 34 when IDP 40 initializes after a failure or an operator of IDP 40 manually determines that certain data is missing.

To identify EVCDUs for retransmission, DMR manager 34 may locate gaps in EVCDU stream 50. As an example and not by way of limitation, DMR manager 34 may determine that, with respect to AP stream 52a, central DHN 36 received APs two and five without receiving APs three and four. DMR manager 34 may also determine that the end of AP two corresponds to EVCDU 3690 and the start of AP five corresponds to EVCDU 4070. Because APs three and four lie between APs two and five, DMR manager 34 may conclude that EVCDUs 3691 through 4069 contain at least APs three and four. With respect to AP stream 52b, DMR manager 34 may determine that central DHN 36 received APs thirty-four and thirty-eight without receiving APs thirty-five through thirty-eight. DMR manager 34 may also determine that the end of AP thirty-four corresponds to EVCDU 3400 and the start of AP thirty-eight corresponds to EVCDU 4170. Because APs thirty-five through thirty-nine lie between APs thirty-four and thirty-nine, DMR manager 34 may conclude that EVCDUs 3401 through 4169 contain at least APs thirty-five through thirty-nine. With respect to AP stream 52c, DMR manager 34 may determine that central DHN 36 received APs fifteen and eighteen without receiving APs sixteen and seventeen. DMR manager 34 may also determine that the end of AP fifteen corresponds to EVCDU 3360 and the start of AP eighteen corresponds to EVCDU 4000. Because APs sixteen and seventeen lie between APs fifteen and eighteen, DMR manager 34 may conclude that EVCDUs 3361 through 3999 contain at least APs sixteen and seventeen.

DMR manager 34 may determine that, therefore, there are gaps in EVCDU stream 50 between EVCDUs 3501 through 3559 and between 3691 through 3999 and that those gaps contain the missing APs. DMR manager 34 may then identify one or more components of system 10 that have stored copies of EVCDUs 3501 through 3559 and between 3691 through 3999. DMR manager 34 may access one or more tracking reports stored at DMR manager 34 to make this determination. As described above, DMR manager 34 may use a VCID (in addition to EVCDU sequence values) to identify the EVCDUs. DMR manager 34 may then identify one or more best sources for the EVCDUs and communicate one or more retransmit requests to the best sources for the EVCDUs.

Figure 3:
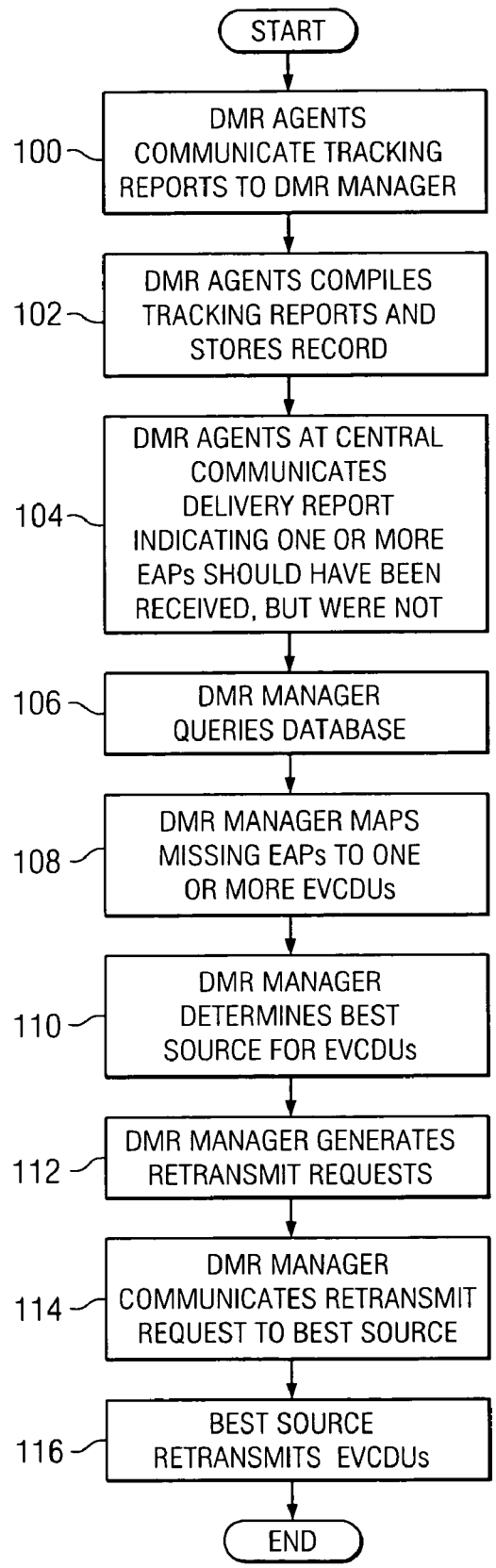
FIG. 3 illustrates an example method for data monitoring and recover in the system illustrated in FIG. 1.

FIG. 3 illustrates an example method for data monitoring and recover in system 10. The method begins at step 100, where DMR agents 32 communicate tracking reports to DMR manager 34. At step 102, DMR manager 34 compiles the tracking reports and stores the resulting record. At step 104, a DMR agent 32 at a central 24 communicates a delivery report to DMR manager 34 indicating one or more EAPs that a central DHN 36 at central should have received, but did not. At step 106, in response to the delivery report, DMR manager 34 runs a database query to map the missing EAPs to one or more EVCDUs and determine a best source for the EVCDUs. In particular embodiments, DMR manager 34 may store delivery reports from DMR agents 32 and, instead of response to individual delivery reports, periodically run queries to determine whether one or more EAPs should have been received at one or more central DHNs 34, but were not. If DMR manager 34 determines that one or more EAPs should have been, but were not, received at one or more central DHNs 34, DMR manager 34 may then run a database query to map the missing EAPs to one or more EVCDUs and determine a best source for the EVCDUs. As described above, in particular embodiments, DMR manager 34 may run the database query in response to a retransmit from one or more IDPs 40.

At step 108, DMR manager 34, using the results of the database query, maps the missing EAPs to one or more EVCDUs. At step 110, DMR manager 34 determines, from the results of the database query, a best source (which may include another central 24, a receptor 20, or a spacecraft 12) for the EVCDUs mapped to the missing EAPs. At step 112, DMR manager 34 generates a retransmit request for the missing EVCDUs. At step 114, DMR manager 34 communicates the retransmit request to the best source. At step 116, the best source receives the retransmit request and retransmits the EVCDUs to central 24, at which point the method ends. In particular embodiments, as described above, before DMR manager 34 generates a new retransmit request, DMR manager 34 may determine whether the new retransmit request would overlap a currently pending retransmit request. If so, DMR manager 34 may, instead of generating the new retransmit request, modify the already pending retransmit request to include the new retransmit request. The method illustrated in FIG. 3 may be repeated as data is communicated through system 10 from SS 12 to IDPS 16 to recover missing EAPs. Although particular steps of the method illustrated in FIG. 3 have been described and illustrated as occurring in a particular order, the present invention contemplates any suitable steps of the method illustrated in FIG. 3 occurring in any suitable order.

Figure 4:
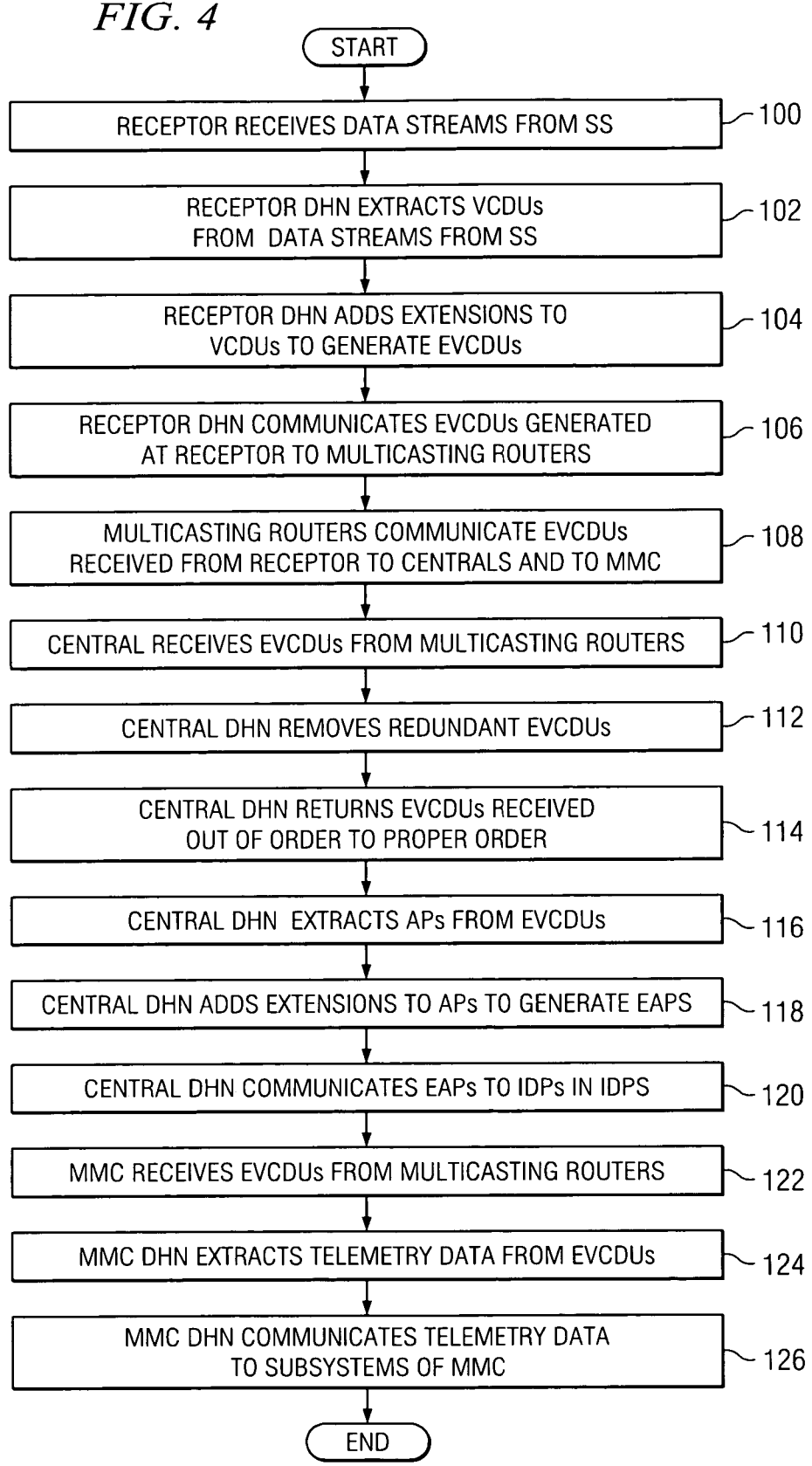
FIG. 4 illustrates an example method for data handling in the system illustrated in FIG. 1.

FIG. 4 illustrates an example method for data handling in system 10. The method begins at step 100, where a receptor 20 receives data from SS 12. At step 102, a receptor DHN 30 at receptor 20 extracts VCDUs from the data received at receptor 20. At step 104, receptor DHN 30 adds extensions to the extracted VCDUs to generate EVCDUs. At step 106, receptor DHN 30 communicates the generated EVCDUs to multicasting routers 22. At step 108, multicasting routers 22 communicate the EVCDUs to one or more centrals 24 and to MMC 26. At step 110, a central 24 receives the EVCDUs communicated from multicasting routers 22. At step 112, a central DHN 36 at central 24 removes redundant instances of EVCDUs from the EVCDUs received at central 24. At step 114, central DHN 36 returns EVCDUs received at central 24 out of order to their proper order. At step 116, central DHN 36 extracts APs from the properly ordered EVCDUs. At step 118, central DHN 36 adds extensions to the extracted APs to generate EAPs. At step 120, central DHN 36 communicates the generated EAPs to one or more IDPs 38 in IDPS 16. At step 122, MMC 26 receives the EVCDUs communicated from multicasting routers 22. At step 124, an MMC DHN 40 extracts telemetry data from the EVCDUs received at MMC 26. At step 126, MMC DHN 40 communicates the extracted telemetry data to one or more subsystems 42 of MMC 26, at which point the method ends. Although particular steps of the method illustrated in FIG. 4 have been described and illustrated as occurring in a particular order, the present invention contemplates any suitable steps of the method illustrated in FIG. 4 occurring in any suitable order. As an example and not by way of limitation, steps 110-120 may occur at approximately the same time as steps 122-126.

Although the present invention has been described with several embodiments, myriad changes, variations, alterations, transformations, and modifications may be suggested to one skilled in the art, and it is intended that the present invention encompass such changes, variations, alterations, transformations, and modifications as fall within the scope of the appended claims. The present invention is not intended to be limited, in any way, by any statement in the specification that is not reflected in the claims.

What is claimed is:

1. A system comprising:
one or more data-handling nodes (DHNs) each residing at one of one or more centrals that are each operable to receive a stream of first data units from a routing system, the stream of first data units comprising both stored mission data (SMD) and telemetry data having originated at one or more remote units, each DHN being operable, in near real time, to:
remove redundant instances of first data units from the stream of first data units;
properly order first data units in the stream of first data units received at the central out of order;
remove misconfigured first data units from the stream of first data units;
extract the SMD from the stream of first data units;
generate second data units from the extracted SMD; and
communicate a stream of the second data units to one or more interface data processors (IDPs).

2. The system of claim 1, wherein the first data units comprise virtual channel data units (VCDUs) or extended VCDUs (EVCDUs) formatted at least in part according to a Consultative Committee for Space Data Systems (CCSDS) protocol.

3. The system of claim 1, wherein the second data units comprise application packets (APs) or extended APs (EAPs) formatted at least in part according to a Consultative Committee for Space Data Systems (CCSDS) protocol.

4. The system of claim 1, wherein SMD having originated at a particular remote unit indicates readings collected at sensors onboard the particular remote unit.

5. The system of claim 1, wherein telemetry data having originated at a particular remote unit indicates a status of each of one or more status points associated with the particular remote unit.

6. The system of claim 1, wherein the remotes units are spacecraft.

7. The system of claim 1, wherein the DHN uses a highwater mark to detect redundant instances of first data units for removal from the stream of first data units.

8. The system of claim 1, wherein the DHN uses sequence values in the first data units to detect improperly sequenced first data units in the stream of first data units for returning to a proper sequence of the first data units in the stream of first data units.

9. The system of claim 1, wherein the DHN uses valid combinations of virtual channel identifiers (VCIDs), remote unit identifiers, and IP addresses recorded at the central to detect misconfigured first data units for removal from the stream of first data units.

10. The system of claim 1, wherein the DHN is further operable to manage storage of first data units received at the central and second data units generated at the receptor.

11. The system of claim 1, wherein the DHN comprises functionality providing automatic failure recovery of the DHN.

12. A method comprising:
at each of one or more data-handling nodes (DHNs) each residing at one of one or more centrals that are each operable to receive a stream of first data units from a routing system comprising both stored mission data (SMD) and telemetry data having originated at one or more remote units, in near real time:
removing redundant instances of first data units from the stream of first data units;
properly ordering first data units in the stream of first data units received at the central out of order;
removing misconfigured first data units from the stream of first data units;
extracting the SMD from the stream of first data units;
generating second data units from the extracted SMD; and
communicating a stream of the second data units to one or more interface data processors (IDPs).

13. The method of claim 12, wherein the first data units comprise virtual channel data units (VCDUs) or extended VCDUs (EVCDUs) formatted at least in part according to a Consultative Committee for Space Data Systems (CCSDS) protocol.

14. The method of claim 12, wherein the second data units comprise application packets (APs) or extended APs (EAPs) formatted at least in part according to a Consultative Committee for Space Data Systems (CCSDS) protocol.

15. The method of claim 12, wherein SMD having originated at a particular remote unit indicates readings collected at sensors onboard the particular remote unit.

16. The method of claim 12, wherein telemetry data having originated at a particular remote unit indicates a status of each of one or more status points associated with the particular remote unit.

17. The method of claim 12, wherein the remotes units are spacecraft.

18. The method of claim 12, further comprising, at the DHN, using a high-water mark to detect redundant instances of first data units for removal from the stream of first data units.

19. The method of claim 12, further comprising, at the DHN, using sequence values in the first data units to detect improperly sequenced first data units in the stream of first data units for returning to a proper sequence of the first data units in the stream of first data units.

20. The method of claim 12, further comprising, at the DHN, using valid combinations of virtual channel identifiers (VCIDs), remote unit identifiers, and IP addresses recorded at the central to detect misconfigured first data units for removal from the stream of first data units.

21. The method of claim 12, further comprising, at the DHN, managing storage of first data units received at the central and second data units generated at the receptor.

22. The method of claim 12, wherein the DHN comprises functionality providing automatic failure recovery of the DHN.

23. One or more computer-readable tangible media encoding software, the software when executed operable:
  at each of one or more data-handling nodes (DHNs) each residing at one of one or more centrals that are each operable to receive a stream of first data units from a routing system comprising both stored mission data (SMD) and telemetry data having originated at one or more remote units, in near real time:
    to remove redundant instances of first data units from the stream of first data units;
    to properly order first data units in the stream of first data units received at the central out of order;
    to remove misconfigured first data units from the stream of first data units;
    to extract the SMD from the stream of first data units;
    to generate second data units from the extracted SMD; and
    communicate a stream of the second data units to one or more interface data processors (IDPs).

24. The computer-readable tangible media of claim 23, wherein the first data units comprise virtual channel data units (VCDUs) or extended VCDUs (EVCDUs) formatted at least in part according to a Consultative Committee for Space Data Systems (CCSDS) protocol.

25. The computer-readable tangible media of claim 23, wherein the second data units comprise application packets (APs) or extended APs (EAPs) formatted at least in part according to a Consultative Committee for Space Data Systems (CCSDS) protocol.

26. The computer-readable tangible media of claim 23, wherein SMD having originated at a particular remote unit indicates readings collected at sensors onboard the particular remote unit.

27. The computer-readable tangible media of claim 23, wherein telemetry data having originated at a particular remote unit indicates a status of each of one or more status points associated with the particular remote unit.

28. The computer-readable tangible media of claim 23, wherein the remotes units are spacecraft.

29. The computer-readable tangible media of claim 23, wherein the software when executed is further operable, at the DHN, to use a high-water mark to detect redundant instances of first data units for removal from the stream of first data units.

30. The computer-readable tangible media of claim 23, wherein the software when executed is further operable, at the DHN, to use sequence values in the first data units to detect improperly sequenced first data units in the stream of first data units for returning to a proper sequence of the first data units in the stream of first data units.

31. The computer-readable tangible media of claim 23, wherein the software when executed is further operable, at the DHN, to use valid combinations of virtual channel identifiers (VCIDs), remote unit identifiers, and IP addresses recorded at the central to detect misconfigured first data units for removal from the stream of first data units.

32. The computer-readable tangible media of claim 23, wherein the software when executed is further operable, at the DHN, to manage storage of first data units received at the central and second data units generated at the receptor.

33. The computer-readable tangible media of claim 23, wherein the DHN comprises functionality providing automatic failure recovery of the DHN.

34. A system comprising:
  at each of one or more data-handling nodes (DHNs) each residing at one of one or more centrals that are each operable to receive a stream of first data units from a routing system comprising both stored mission data (SMD) and telemetry data having originated at one or more remote units:
    means for, in near real time, removing redundant instances of first data units from the stream of first data units;
    means for, in near real time, properly ordering first data units in the stream of first data units received at the central out of order;
    means for, in near real time, removing misconfigured first data units from the stream of first data units;
    means for, in near real time, extracting the SMD from the stream of first data units;
    means for, in near real time, generating second data units from the extracted SMD; and
    means for, in near real time, communicating a stream of the second data units to one or more interface data processors (IDPs).

* * * * *